United States Patent [19]
Klok et al.

[11] Patent Number: 5,930,250
[45] Date of Patent: Jul. 27, 1999

[54] COMMUNICATION SYSTEM FOR INTERACTIVE SERVICES WITH A PACKET SWITCHING INTERACTION CHANNEL OVER A NARROW-BAND CIRCUIT SWITCHING NETWORK, AS WELL AS A DEVICE FOR APPLICATION IN SUCH A COMMUNICATION SYSTEM

[75] Inventors: Frederik Harm Klok, Rijswijk; Arian Koster, Mijdrecht; Mark Johannes Gerardus Dirksen, Leidschendam, all of Netherlands

[73] Assignee: Koninklijke KPN N.V., Groningen, Netherlands

[21] Appl. No.: 08/709,325

[22] Filed: Sep. 4, 1996

[30] Foreign Application Priority Data

Sep. 8, 1995 [NL] Netherlands ............... 1001162

[51] Int. Cl.$^6$ .................. H04L 12/28; H04L 12/56; H04L 12/66
[52] U.S. Cl. ............... 370/352; 370/395; 370/401; 370/466; 455/4.2
[58] Field of Search .................. 370/352, 354, 370/355, 389, 395, 401, 466, 467, 474, 486, 487; 379/93.01; 455/3.1, 4.1, 4.2, 5.1; 348/7, 8, 12, 13

[56] References Cited

U.S. PATENT DOCUMENTS

| | | | |
|---|---|---|---|
| 4,556,972 | 12/1985 | Chan et al. | 370/354 |
| 4,713,837 | 12/1987 | Gordon | 379/106.07 |
| 4,890,320 | 12/1989 | Monslow et al. | 455/4.2 |
| 4,941,040 | 7/1990 | Pocock et al. | 348/7 |
| 5,014,266 | 5/1991 | Bales | 370/354 |
| 5,182,748 | 1/1993 | Sakata et al. | 370/466 |
| 5,412,416 | 5/1995 | Nemirofsky | 455/3.1 |
| 5,459,722 | 10/1995 | Sherif | 370/395 |

FOREIGN PATENT DOCUMENTS

| | | |
|---|---|---|
| 0 418 812 A2 | 3/1991 | European Pat. Off. . |
| 0 690 653 | 1/1996 | European Pat. Off. . |
| 0 722 237 | 7/1996 | European Pat. Off. . |
| 2 280 337 | 1/1995 | United Kingdom . |
| 2 282 027 | 3/1995 | United Kingdom . |
| WO 91/17618 | 11/1991 | WIPO . |

OTHER PUBLICATIONS

H. Katz et al; "Teleaction Services: Standards and Architectures"; Jun. 1994; pp. 54–65; IEEE Communications Magazine.

M. Lemonier et al; "Plate–forme ATM pour le multiplexeur de services du projet Brehat"; 1994; pp. 13–20; TRT French Telecom.

*Primary Examiner*—Chi H. Pham
*Assistant Examiner*—William Luther
*Attorney, Agent, or Firm*—Frishauf, Holtz, Goodman, Langer & Chick

[57] ABSTRACT

The invention relates to a communication system (100) in which information (AV) from a server (101) is transmitted in one direction via a first communication path to a user terminal (102), such as a PC. In response to said information, the user can transmit selection information (I), such as control commands, in the form of data packets via a second communication path. According to the invention the data packets, for example ATM cells, are transmitted in the second communication path over a non-packet switching network (107), such as a telephony network. The invention further provides a device (108; 200) for receiving and routing data packets from a non-packet switching network (107), as well as a method for implementing telecommunication services in which use is made of a communication system (100; 100') of the above-mentioned kind.

18 Claims, 3 Drawing Sheets

COMMUNICATION SYSTEM FOR INTERACTIVE SERVICES WITH A PACKET SWITCHING INTERACTION CHANNEL OVER A NARROW-BAND CIRCUIT SWITCHING NETWORK, AS WELL AS A DEVICE FOR APPLICATION IN SUCH A COMMUNICATION SYSTEM

BACKGROUND OF THE INVENTION

The invention relates to a communication system which is suitable for the carrying out of services, especially interactive communication services. More in particular, the invention is related to a communication system comprising a first communication path between a services station and a user station, as well as a second communication path between the user station and the services station, the user station being arranged for the issuing of data packets and the user station being arranged for the reception of data packets.

Offering user information to users in a telecommunication system by way of service via a first communication path, for example a cable network, is known in the art. Such information, which in general comprises audio-visual information (such as films), is transmitted from a services station (such as a so-called server) to the users via the cable network. In this regard the users have a user station (terminal) such as a PC or a television set on which the user information concerned is received.

For various services it is desirable that users can transmit selection information to the services station, where this selection information can contain control commands, for example. Thus users can choose from a list of films, supply answers in TV games or control an object, and so on. If the user station comprises a television set, a telephone set is often used for transmitting the selection information.

The need for integrated solutions for user stations, in which the station is suitable both for receiving and displaying user information and for the entry of selection information by the user and the transmission thereof to the services station, is making itself more and more felt. To this end, integrated stations (terminals) are proposed, which are arranged for the issuing of selection information in the form of data packets, such as ATM cells.

In this regard, the problem arises that existing communication systems comprise networks which are not arranged for the transmission of data packets. The public telephony network ("PSTN" or "Public Switched Telephone Network"), for example, has no provisions for the transmission of data packets. It is therefore necessary that the data packets, which are issued by the said stations, are converted into data which indeed can be transmitted over the telephony network. Furthermore, services stations must be arranged for the reception of data which are transmitted in various forms. This brings with it the necessity of providing different interfaces for different network services at one services station, which is expensive. It is also possible to connect the user station to the services station by means of a special network which is arranged for the transmission of data packets. Such a special network is expensive, however, and can not be applied everywhere.

It is known from the Prior Art to transmit voice band signals via an ATM network, as e.g. disclosed in EP 0 690 653 and EP 0 722 237. It is also known to transmit data packets using a telephone switching network, as e.g. disclosed in EP 0 418 812.

A system in which messages are broadcast and in which a call-back facility is used, is disclosed in U.S. Pat. No. 4,713,837. Said U.S. Patent does, however, not deal with consumer services but with the remote reading of meters for the purpose of electronic billing. Furthermore, said Patent does not disclose the transmission of data packets via PSTN.

Other Prior Art may be found in GB 2 280 337 and GB 2 282 027. All said Prior Art documents are herewith incorporated by reference in this text.

SUMMARY OF THE INVENTION

It is an object of the invention to eliminate the above-mentioned and other disadvantages of the prior art and to provide a communication system which makes possible the transmission, by means of predominantly existing technical means, of user information from the services station to the user station on the one hand, and of selection information in the form of data packets from the user station to the services station on the other hand.

It is a further object of the invention to provide a communication system which makes the application possible, independently of the available network, of equipment which is arranged for a certain packet-switching network (also called packet switched network).

It is a still further object of the invention to provide an efficient routing scheme for routing data packets over dissimilar networks.

In order to achieve these and other ends, the present invention provides a communication system, comprising a first communication path between a services station and a user station as well as a second communication path between the user station and the services station, the user station being arranged for the issuing of data packets according to a first protocol and the services station being arranged for the reception of data packets according to the first protocol, the second communication path comprising:
 a first network arranged for the transmission of data according to a second protocol,
 a first device for receiving data packets from the user station and for supplying said data packets to the first network, and
 a second device for receiving said data packets from the first network and for routing the received data packets to the services station via a second network arranged to the transmission of data according to the first protocol.

By means of a communication system of this type, it is possible to transmit data packets over an existing network, the existing network not necessarily being arranged for the transmission of data packets. It is further possible to use said user stations, for example in the form of ATM terminals, in all locations and circumstances, that is to say, also in instances where the network is not arranged for ATM. Hereby the advantage is furthermore offered that a services station need be provided with only one interface to a network service (such as ATM), instead of different interfaces for different network services and network protocols.

The invention is based on the insight that it is possible to transfer data packets over a non-packet switching network, and on the further insight that a broad-band service (such as ATM) can be transmitted over a narrow-band network (such as PSTN). In this respect it is also realised that distinction can be made between the service, as this is applied by (the equipment of) users, and the technique with which the service is implemented. Thus, in accordance with the invention, the ATM service can be transmitted over the PSTN technique.

The invention is also based on the further insight that, with the aid of the above-mentioned measures, a communication system with unlike communication paths can be established in a very suitable manner.

The first communication path can comprise a satellite trajectory and/or a cable network, which in most cases only enables transmission in one direction and is therefore purely distributive. The first communication path can furthermore comprise a packet switching network. The second communication path comprises, for example, a telephony network.

It is also possible to implement the communication system according to the invention in such a manner that the second communication path comprises an ISDN network. In that case, the data packets can comprise X.25 packets for example. In particular, ATM cells can be transmitted over an ISDN network by means of X.25 packets.

It is another object of the invention to provide a device for application in such a system, as well as a method for the transmission of ATM cells over a non-packet switching network.

EXEMPLARY EMBODIMENTS

The invention will be further explained below on the basis of the figures.

FIG. 1 diagrammatically shows a first communication system according to the invention.

FIG. 2 diagrammatically shows a second communication system according to the invention.

FIG. 3 diagrammatically shows a device for application in a system according to the invention.

The first embodiment of a communication system 100 according to the invention, shown in FIG. 1 by way of example, comprises a services station (server) 101 and a user station (terminal) 102, between which a first and a second communication path are present. The first communication path, which serves for the transmission of user information (such as audio-visual information, designated by AV) from the services station 101 to the user station 102, comprises a first local network 103, a transmission trajectory 104, and a second local network 105. In this regard the first local network 103 is for example, in the case of ATM, a so-called ATM backbone, that is to say a network, arranged for ATM, which provides the connection between the services station 101 and the transmission trajectory 104. The term network should not be contrued in a limiting sense and is meant to include single cable connections. The second local network 105, the so-called access network, can also consist of a single cable connection and need not contain any switching means.

In the example shown, the transmission trajectory 104 comprises a first antenna 111, a second antenna 112 and a communication satellite 110. In the case shown, the transmission trajectory 104 is uni-directional, so that a user of the user station 102 can not transmit any information from said user station via the transmission trajectory 104 to the services station 101.

The second communication path, for the transmission of selection information (that is, "interaction information", designated by I, for the service concerned) from the user station 102 to the services station 101, comprises a first device 106,a network 107, and a second device 108. The communication system 100 according to the invention is preferably embodied in such a manner, that the first device 106 is integrated in the user station 102. In this regard the first device 106, which supplies data packets to the network, can be embodied as a plug-in card for application in the user station. The second device 108, which receives data packets from the network 107 and transmits said data packets to the local network 103, will be further explained later on the basis of FIG. 3. If required, the second device 108 can be included in the services station 101. It is observed that, in principle, the "local" network 103 is a purely local network which can be formed by a single connection, but which can also comprise an international network.

The telecommunication network 107 is shown as an ordinary ("fixed") telephony network (PSTN=Public Switched Telephone Network) by way of example, but could also be a mobile network, for example a GSM network. An ISDN network could also be applied. In the example shown, the selection or interaction information I is transmitted over the network 107 of the second communication path in the form of ATM cells. It will be clear that the system 100 can comprise several services stations 101, user stations 102 and/or second devices 108.

As is apparent from FIG. 1, there are in fact two parallel networks present for the two (outward and returning respectively) communication paths: one network for satellite communication on the first (outward) communication path, and one network for telephony on the second (returning) communication path. Apart from that, the second communication path, which forms a so-called interaction channel, can be suitable for information transmission in two directions. Bi-directional traffic can be advantageous, for example, for user identification in case of orders and/or payments.

The invention makes use of the fact that user stations (102) are often arranged for the issuing of data packets, such as ATM cells. Apart from the adaptation in the device (packet adaptor or PA) 106, conversion of such data packets is unnecessary.

The routing of user information to the services station 101 concerned can take place in several ways.

In a first scenario, an individual number (of the circuit switching network) is assigned to each services station, that number providing access to certain device 108 (or 200 respectively—see FIG. 3—if in one device 108 several devices 200 are accommodated). The data packets extracted by the device 108 concerned are supplied to a specific port of the packet switching network 103, which port is related to a certain services station 101. In this case a device 108 (or 200 respectively) is assigned to each services station, and there is one (in principle fixed) relationship between a telephone number, by which the device 108 can be reached via the PSTN, and a virtual path of the ATM network 103. Even if several telephone numbers (in general: access numbers) provide access to the same device 108, such a relationship between telephone number and virtual path may exist. In this case, an identification of the virtual path concerned (or services station respectively) is preferably provided with the telephone number.

Such a fixed relationship between a services station (server) 101 and a device (interworking unit or IWU) 108 can be established in several ways. In a first embodiment, a semi-permanent path is established between the device 108 and the server 101. This can be realized in the ATM protocol by establishing beforehand a virtual path (VP). Optionally, the path may be set up as the result of the first call to the device 108 and may be terminated if no further call has been received for a certain amount of time. In this first embodiment, each data packet arriving in the device 108 is routed to the corresponding predetermined virtual path. Optionally, virtual connections (VCs) may be established within the virtual path, in which case the device 108 may carry out a virtual channel translation. Data packets sent by the server 101 to the user 102 also pass through the packet switching network 103. For this reason, data traffic should be assigned to the same virtual channel (VC) for both directions. Semi-permanent paths are advantageous in situations where a services station frequently receives a large amount of interactive data traffic.

In a second embodiment of a fixed relationship between a services station (server) 101 and a device (interworking unit) 108 the device 108 actively established a packet switching connection with the server 101 when the device 108 receives an incoming call from a user via the network 107. The telephone number dialled indicated with which server 101 a connection is to be established. Once a connection is made, the first device 106 has a connection with the server 101. This proxy type of signalling does not require the first device 106 to handle packet switching protocols, as such protocols are handled by the second device 108.

In a second scenario, a single device 108 is used for several services stations, this device functioning as access port (gateway) for the group of services stations concerned. In that case a generic access number (e.g. 800-SERVICE) can be chosen from the user device (station) 102, the network 107 concerned preferably being arranged for permitting several simultaneous calls to the same number (i.e. the same server 101). Here too the device 108 can advantageously comprise several devices 200 (see FIG. 3). The network 107 is in fact made transparent for the data packets (ATM cells) which are to be transmitted by letting the signalling take place by means of the packet switching protocol (in this case ATM). In the network 103, data packets are conveyed to the services station concerned on the basis of their addressing. In this case, the circuit switching network (such as PSTN) does not need to generate separate signalling in the form of an identification of the services station.

A generic access number can be implemented in several ways. In a first embodiment, the device 106 calls the generic number, upon which the device 108 provides a transparant link with the packet switching network 103 by establishing a path (e.g. a VP=Virtual Path). Subsequently, the device 106 uses the regular signalling protocols of the packet switching network 103 to set up a connection to the services device (server) 101. In a second embodiment, the device 106 passes the access number (e.g. ATM access number) of the desired server 101 to the device 108 by means of a data packet (e.g. an ATM cell). The device 108 interprets the access number and uses this information to set up a connection to the server requested by means of regular packet switching protocols The second device 108 thus routes data packets, received from the first device 106, to the proper server 101. In a third embodiment, a semi-permanent path is established between a services device 101 and the second device 108. Upon broadcasting e.g. an interactive program, the server 101 sends the adress or identifier of this path (e.g. a VPI=Virtual Path Identifier) to the device 108. When a user calls the generic services number, he transmits data packets containing a temporary (fictitious) channel identifier (e.g. a VCI=Virtual Channel Identifier) as well as the said path identifier received from the server 101. The second device 108 then routes the data packets using the path identifier (VPI) and, if necessary, adapts the channel identifier (VCI). In this way, a very efficient routing is achieved.

The second embodiment of a communication system 100' according to the invention, shown in FIG. 2 by way of example, also comprises a services station (server) 101 and a user station (terminal) 102, between which a first and a second communication path are present. The first communication path, which serves for the transmission of user information (such as audio-visual information, indicated by AV) from the services station 101 to the user station 102 comprises, as in the case of FIG. 1, a first local network 103, a transmission trajectory 104, and a second local network 105.

In the example of FIG. 2, the transmission trajectory 104 comprises a cable network 115. Such a cable network can be suitable, for example, for the distribution of television signals. In the case shown the transmission trajectory 104 is uni-directional, so that a user of the user station 102 can not transmit information from the user station via the transmission trajectory 104 to the services station 101.

In this case also, the second communication path, for the transmission of selection information (or "interaction information" I for the service concerned) from the user station 102 to the services station 101, comprises a first device 106, a network 107 and a second device 108. In the example shown the network 107 is an ISDN network, but it could also comprise a PSTN or a GSM network.

In the case of ISDN, the transmission of selection information (I) by the network 107 can take place in various ways. If the B channel of ISDN is used, it is necessary to send padding data from the device 106 ("stuffing"), since the selection information in most cases will consist of commands having a relatively short duration. If the D channel of ISDN is used, the data packets can be transmitted by means of the X.25 protocol. In the case of ATM in this regard, ATM cells are transmitted in X.25 data packets. Although because of this the so-called overhead of the information transmission will increase, this is not relevant in precisely this case due to the character mentioned of the selection information.

The communication systems of the FIGS. 1 and 2 are pre-eminently suitable for the implementation of telecommunication services. In the case shown information (namely selection information) is transmitted over the second communication path to the services station, that is to say, to the source of the user information. It will be clear, however, that the selection information can also be conveyed to another destination, in which case the source of the user information and the destination of the selection information do not coincide. This can be the case if the user information, for example, contains a list of companies where information can be requested, and the selection information contains the companies selected from said list. In that case the selection information can, for example, be transmitted directly to the companies concerned (or to a collection point established for those companies).

In the communication systems according to the invention distinction can be made between the network service, as applied by (the equipment of) the users, and the technique with which this network service is realised. Thus, according to the invention, the network service ATM can be transmitted over the PSTN technique. The devices 101 and 102 can make use of the network service ATM, while a relatively narrow-banded, circuit switching network like PSTN is used as technique.

In the communication systems of the FIGS. 1 and 2, a device 106 is applied for the transmission of data packets from the user station 102 to the network 107. Such a device can comprise a buffer for data packets, a parallel/serial converter and a modulator. If the device is to be suitable for bi-directional traffic, a demodulator must also be present. The device 106 can be further provided with means for the issuing of dialling information, such as a DTMF generator, in combination with a suitable memory for the storage of dialling information. This dialling information is used for the dialling of an access number (for PSTN: a telephone number) of a services station. If required the device can be further provided with means for the entry of dialling information, such as a keyboard or a link with the user station for the entry of dialling information in an electronic manner.

A device for the bi-directional transmission of information which is a suitable embodiment of the above-mentioned second device 108 will now be explained with reference to FIG. 3. The device of FIG. 3 could, if required, also be applied as device 106 (cf. FIG. 1).

The device 200 shown diagrammatically and by way of example in FIG. 3 comprises a control unit 201, a modulator/demodulator 202, a data converter 203, a first buffer 204, a second buffer 205, a header detector 206, a counter 207, an address multiplexer 208, an input/output multiplexer 209, and a memory 210 (in which a switching table may be stored). Data paths are indicated by double lines, control connections by single lines.

The embodiment of the device 200 shown in FIG. 3 is bi-directional: the device 200 is both suitable for the reception of data packets from a narrow-band, circuit switching network such as PSTN, and for the issuing of data packets to such a network. In this manner, by a single device 200 the second communication path can be arranged as a bi-directional interaction channel.

Signals received from the PSTN are demodulated in the modulator/demodulator 202 and, in the data converter 203, converted from serial to parallel data which are stored in the first buffer 204. In the header detector 206 it is simultaneously determined whether a header of a data packet is present in the data received. To this end, the header detector 206 comprises a (supplementary) buffer and a comparator circuit. Data (serial bytes) are read into the buffer 204 until a header is recognised. If (in the case of ATM) five bytes are present in the buffer 204 and no header has been recognised, the first byte received is discharged on reception of each following byte. The buffer 204 is therefore a FIFO buffer, and preferably comprises a shift register so that the discharging of bytes can take place by shifting out. The counter 207 keeps count of how many bytes of a recognised header have been received. If a header is recognised, a signal (valid_cell) is issued to the control unit 201 via the counter 207, said signal indicating that a valid header, and therewith a data packet (in this example: an ATM cell), is present. The counter 207 can also keep count of the number of valid bytes of the useful load ("payload") of the data packet.

After a complete data packet has been received, the control unit 201 issues a signal (cell_in_buffer) to the input/output multiplexer 209 to indicate that a complete data packet is present in the first buffer 204. Upon the reading of the buffer 204 by the multiplexer 209, the address of the data packet (for example, the ATM address) is replaced by an address which is read out from a table in the memory 210 and supplied to the multiplexer 209 via the control unit 201 and the address multiplexer 208. The data packet is subsequently multiplexed into a packet switching connection, in the case of ATM in a so-called SDH or PDH bitpipe for example. In the multiplexer 209, therefore, a speed adaptation also takes place.

Between the control unit 201 and the buffers 204 and 205 control connections are present, which for the sake of clarity of the figure are not fully shown. Such control connections transmit signals such as read_buf1, read_buf2, buf_empty1, buf_empty2, write_buf1, write_buf2. Between the control unit 201 and the converter 203 the signals byte_av_in and byte_av_out are exchanged; between the control unit 201 and the multiplexer 209 the signals cell_in_buf and cell_to_pstn. The multiplexer 209 can further provide the signals read_buf1 and write_buf2 to the buffers 204 and 205. The control unit 201 sends a request to the switching table with the signal address_request.

In principle, data packets originating from a packet switching network pass through the device 200 in opposite direction, that is to say from left to right in FIG. 3. Received data packets are de-multiplexed in the input/output multiplexer/de-multiplexer and conveyed to the second buffer 205 (signal write_buf2). Under the influence of control unit 201, a stored data packet is subsequently transferred to the data converter 203 for parallel/serial conversion. Finally, the data packet is issued to the circuit switching network (for example PSTN or ISDN) via the modem 202. An RS-232 connection can be present between the data converter 203 and the modem 202. Instead of to a telephony network, the device 200 can also be connected to an ISDN network. In that case, the component 202 comprises a so-called terminal adapter (TA). The device 200 can also be made suitable for non-ATM applications in a simple manner.

On receiving data packets from a circuit switching network (such as PSTN), the device 200 therefore performs the following operations:

the demodulation and digitalisation of received signals;
the extraction of data packets from the digitised information;
the buffering of received data packets;
the re-routing of the data packets (addressing modification);
the multiplexing of the re-routed data packets in a packet switching connection (such as an SDH connection).

In the case shown, the device 200 can furthermore carry out the inverse operations.

By the said modification of the addressing, a large degree of freedom of addressing can be permitted. Thus data packets, which are provided with a destination address in a user station 102 (see FIG. 1 and FIG. 2), can be provided with another address in the device 200 (of which one of more can be included in the device 108 of FIG. 1 and FIG. 2). This has the advantage that the user station need not know both the access number of the services station in the network 107 (for example, the telephone number) and the address in the packet switching network (for example, the ATM address).

It will be understood by those skilled in the art that the invention is not limited to the embodiments shown, and that many modifications and additions are possible without departing from the scope of the present invention. Thus the invention can not only find application in communication systems for interactive services, such as multi-media services, but also in other communication services in which data packets are required to be transmitted over a circuit switching network.

We claim:

1. A communication system comprising:
a first communication path between at least one services station and a user station; and
a second communication path between the user station and the at least one services station,
wherein the user station is arranged for issuing data packets according to a first protocol and the at least one services station is arranged for receiving the data packets according to the first protocol, and wherein the second communication path comprises:
   a first network arranged for transmitting data according to a second protocol,
   a first device for receiving the data packets issued by the user station and for supplying said data packets to the first network, and
   a second device for receiving said data packets from the first network and for routing the received data packets to the at least one services station via a second network arranged for transmitting data according to the first protocol.

2. The communication system according to claim 1, wherein the second device is arranged for establishing a path to the at least one services station, said path having an identifier assigned thereto, and wherein the second device provides the received data packets with said path identifier.

3. The communication system according to claim 1, wherein the second device is arranged for providing access to a group of services stations having a common single access number.

4. The communication system according to claim 1, wherein the second device is arranged for providing access to a single services station having a unique access number.

5. The communication system according to claim 1, wherein the first network comprises a telephony network.

6. The communication system according to claim 1, wherein the first network comprises an ISDN (Integrated Digital Services Network).

7. The communication system according to claim 1, wherein the first communication path comprises a satellite trajectory.

8. The communication system according to claim 1, wherein the first communication path comprises a cable network.

9. The communication system according to claim 1, wherein the first protocol an ATM (Asynchronous Transmission Mode) protocol.

10. A device comprising:
   means for demodulating signals received over a non-packet switching network,
   means for extracting data packets from the demodulated signals,
   means for buffering the extracted data packets,
   means for routing the buffered data packets based on information received from the non-packet switching network,
   means for multiplexing the routed data packets,
   means for supplying the multiplexed data packets to a packet switching network, and
   means for controlling the device.

11. The device according to claim 10, further comprising:
   means for demultiplexing the data packets,
   means for buffering the demultiplexed data packets,
   means for converting the buffered, demultiplexed data packets into serial data signals,
   means for modulating the serial data signals, and
   means for issuing the modulated data signals.

12. The device according to claim 10, wherein the means for extracting data packets comprises means for extracting ATM (Asynchronous Transmission Mode) cells, and wherein the packet switching data network comprises an SDH (Synchronous Digital Hierarchy) connection.

13. The device according to claim 10, wherein the means for extracting data packets comprises means for extracting X.25 packets, and wherein the packet switching network comprises an ISDN (Integrated Services Digital Network).

14. The device according to claim 10, further comprising means for modifying addresses of the data packets.

15. A method for transmitting an ATM (Asynchronous Transmission Mode) cell over a non-packet switching network, comprising:
   at a transmitting end:
      converting the ATM cell into a serial form;
      modulating data of the ATM cell;
      selecting a connection over the non-packet switching network;
      transmitting the modulated data over the non-packet switching network; and
   at the receiving end:
      receiving the modulated data;
      demodulating the received data;
      converting the modulated data into a parallel form;
      reconstructing the ATM cell,
      deriving a path identifier from signalling information received over the non-packet switching network, and
      modifying an address of a data packet by assigning said path identifier to the data packet.

16. The method according to claim 15, wherein the non-packet switching network comprises a switched public telephony network.

17. The method according to claim 15, wherein the non-packet switching network comprises an ISDN (Integrated Services Digital Network).

18. The method according to claim 15, wherein the ATM cell is transmitted in X.25 packets.

* * * * *

(12) EX PARTE REEXAMINATION CERTIFICATE (9838th)
United States Patent
Klok et al.

(10) Number: US 5,930,250 C1
(45) Certificate Issued: Sep. 16, 2013

(54) COMMUNICATION SYSTEM FOR INTERACTIVE SERVICES WITH A PACKET SWITCHING INTERACTION CHANNEL OVER A NARROW-BAND CIRCUIT SWITCHING NETWORK, AS WELL AS A DEVICE FOR APPLICATION IN SUCH A COMMUNICATION SYSTEM

(75) Inventors: Frederik Harm Klok, Rijswijk (NL); Arian Koster, Mijdrecht (NL); Mark Johannes Gerardus Dirksen, Leidschendam (NL)

(73) Assignee: Koninklijke KPN N.V., The Hague (NL)

Reexamination Request:
No. 90/012,697, Sep. 28, 2012

Reexamination Certificate for:
Patent No.: 5,930,250
Issued: Jul. 27, 1999
Appl. No.: 08/709,325
Filed: Sep. 4, 1996

(30) Foreign Application Priority Data

Sep. 8, 1995 (NL) ....................... 1001162

(51) Int. Cl.
*H04Q 11/04* (2006.01)

(52) U.S. Cl.
USPC ........ 370/352; 370/395.6; 370/401; 370/466; 725/114; 725/122

(58) Field of Classification Search
None
See application file for complete search history.

(56) References Cited

To view the complete listing of prior art documents cited during the proceeding for Reexamination Control Number 90/012,697, please refer to the USPTO's public Patent Application Information Retrieval (PAIR) system under the Display References tab.

*Primary Examiner* — Nick Corsaro

(57) ABSTRACT

The invention relates to a communication system (100) in which information (AV) from a server (101) is transmitted in one direction via a first communication path to a user terminal (102), such as a PC. In response to said information, the user can transmit selection information (I), such as control commands, in the form of data packets via a second communication path. According to the invention the data packets, for example ATM cells, are transmitted in the second communication path over a non-packet switching network (107), such as a telephony network. The invention further provides a device (108; 200) for receiving and routing data packets from a non-packet switching network (107), as well as a method for implementing telecommunication services in which use is made of a communication system (100; 100') of the above-mentioned kind.

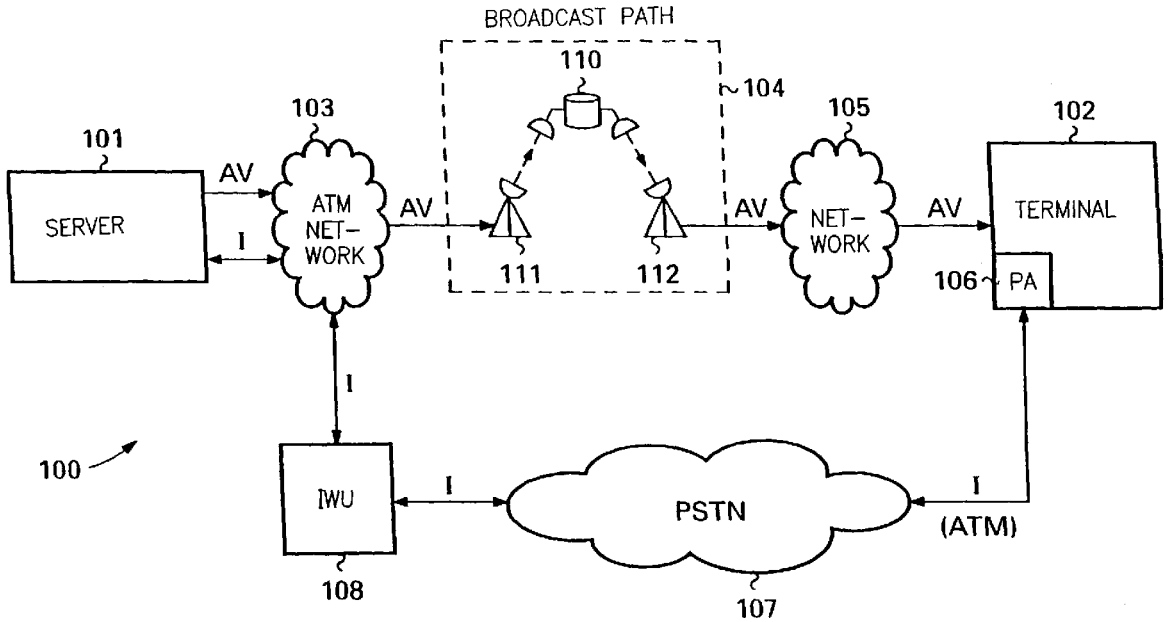

EX PARTE REEXAMINATION CERTIFICATE ISSUED UNDER 35 U.S.C. 307

Figure 1:
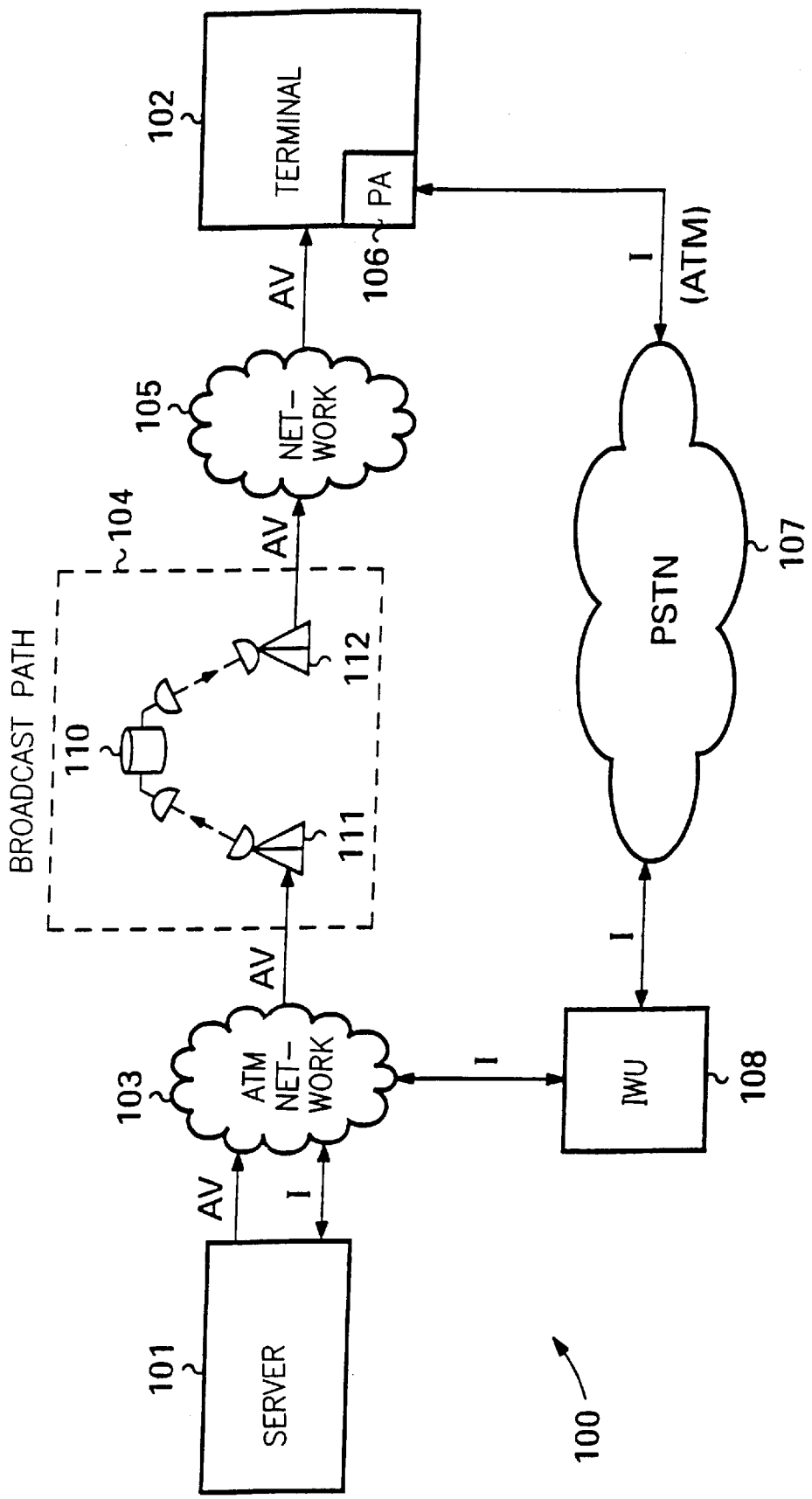
Figure 2:
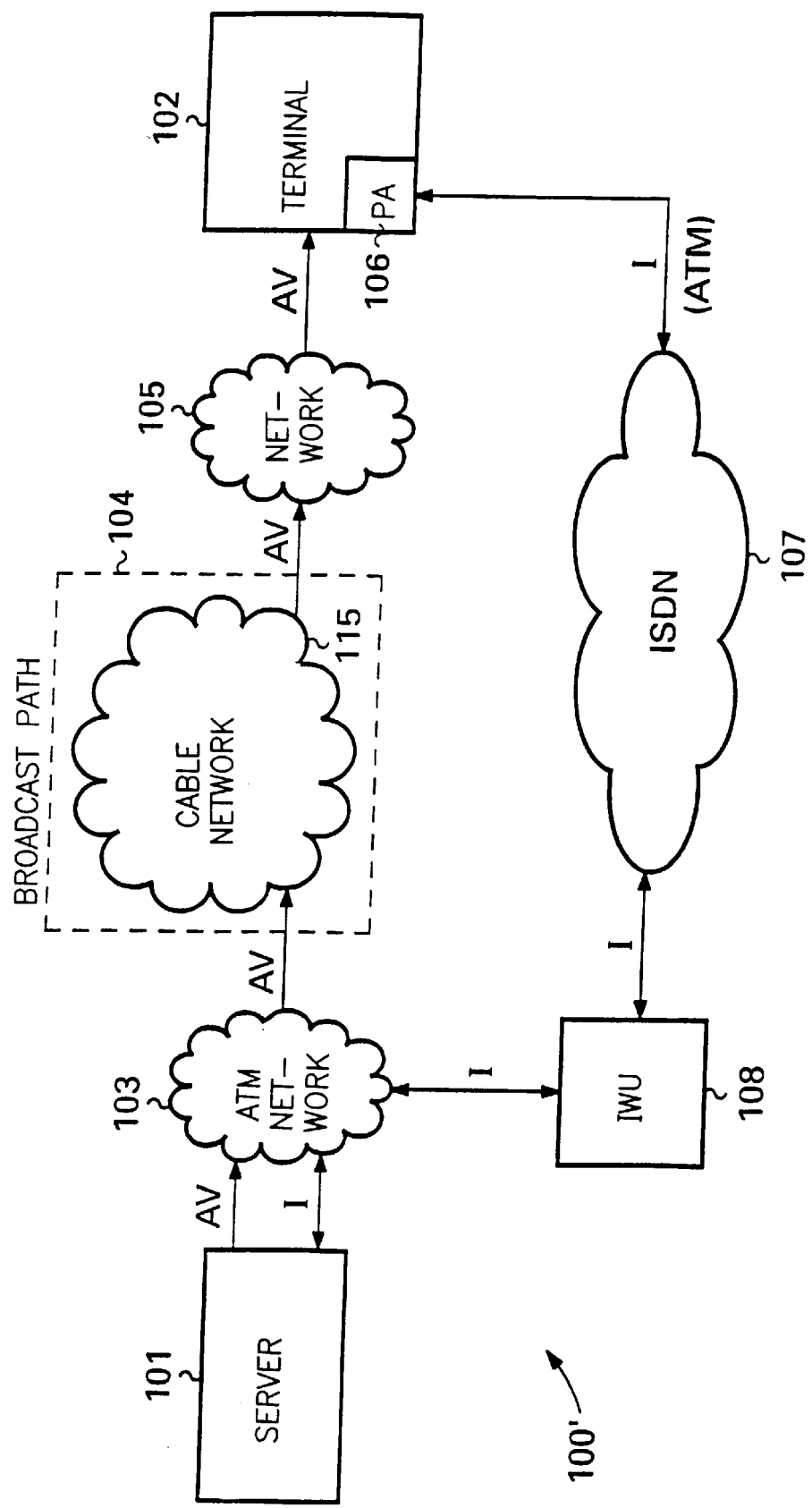
Figure 3:
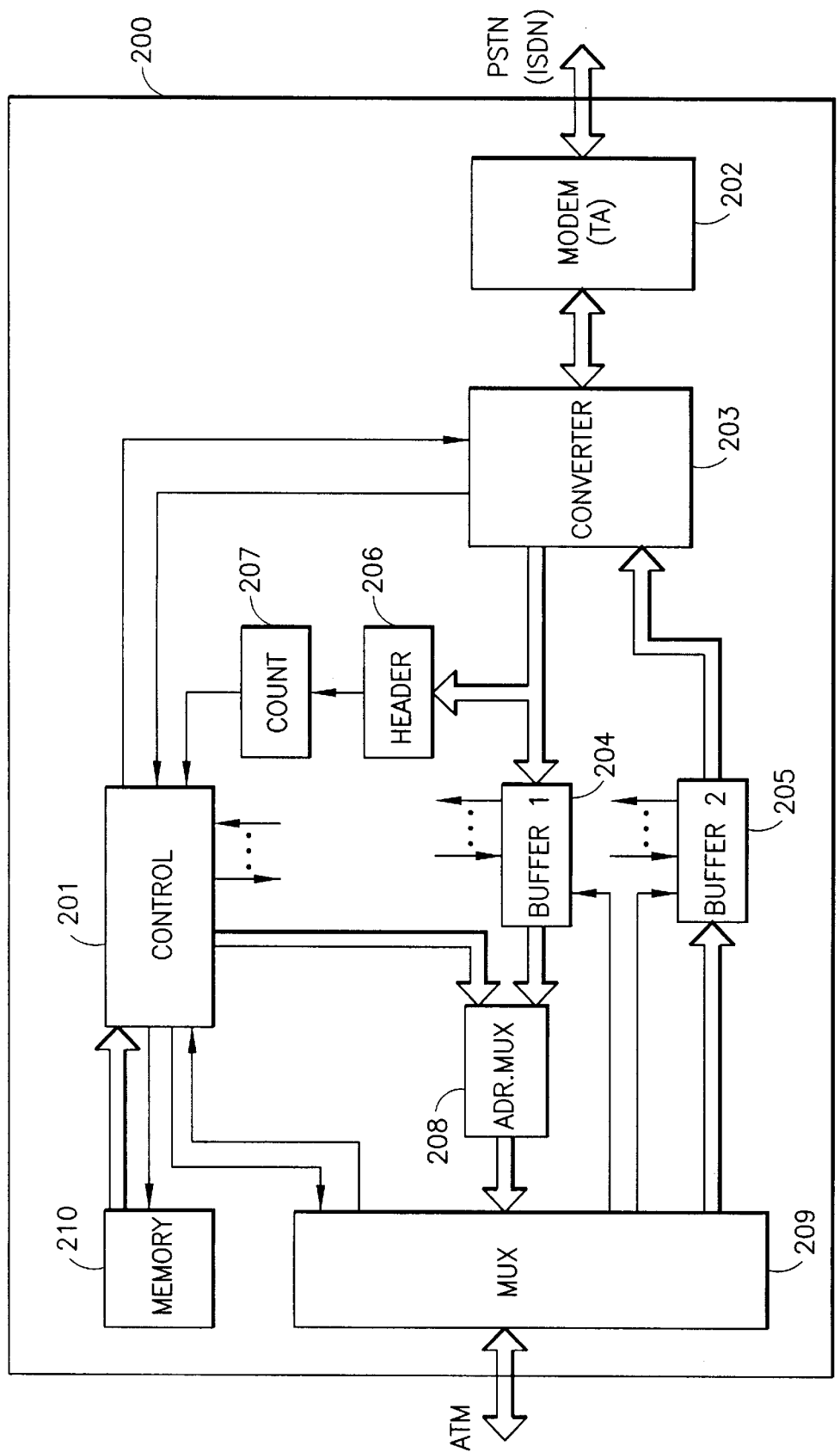

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is cancelled.

Claims 5, 7 and 8 are determined to be patentable as amended.

New claims 19, 20 and 21 are added and determined to be patentable.

Claims 2-4, 6 and 9-18 were not reexamined.

5. The communication system according to claim [1] *19*, wherein the first network comprises a telephony network.

7. The communication system according to claim [1] *19*, wherein the first communication path comprises a satellite trajectory.

8. The communication system according to claim [1] *19*, wherein the first communication path comprises a cable network.

*19. A communication system comprising:*

*a first communication path between at least one services station and a user station; and*

*a second communication path between the user station and the at least one services station,*

*wherein the user station is arranged for issuing data packets according to a first protocol and the at least one services station is arranged for receiving the data packets according to the first protocol, and*

*wherein the second communication path comprises:*

*a first network arranged for transmitting data according to a second protocol,*

*a first device for receiving the data packets issued by the user station and for supplying said data packets to the first network, and*

*a second device for receiving said data packets from the first network and for routing the received data packets to the at least one services station via a second network arranged for transmitting data according to the first protocol,*

*wherein the routing of the received data packets by the second device comprises providing an address in the second network to the data packets to be transmitted to the services station, the address in the second network being provided on the basis of information received from the first network.*

*20. A communication system comprising:*

*a first communication path between at least one services station and a user station; and*

*a second communication path between the user station and the at least one services station,*

*wherein the user station is arranged for issuing data packets according to a first protocol and the at least one services station is arranged for receiving the data packets according to the first protocol, and*

*wherein the second communication path comprises:*

*a first network arranged for transmitting data according to a second protocol,*

*a first device for receiving the data packets issued by the user station and for supplying said data packets to the first network, and*

*a second device for receiving said data packets from the first network and for routing the received data packets to the at least one services station via a second network arranged for transmitting data according to the first protocol,*

*wherein the routing of the received data packets by the second device comprises modifying an address of the received data packets to another address.*

*21. The communication system according to claim 19, wherein the at least one services station issues data packets according to the first protocol, and the second device receives from the second network the data packets issued by the service station and routes these data packets to the user station via the first network arranged for transmitting data according to the second protocol.*

* * * * *